United States Patent [19]

Tabler

[11] 4,448,296
[45] May 15, 1984

[54] LIVE GUIDE SYSTEM FOR GRAVITY CONVEYORS

[75] Inventor: Charles P. Tabler, Hamilton, Ohio

[73] Assignee: Buckhorn Material Handling Group Inc., Cincinnati, Ohio

[21] Appl. No.: 300,181

[22] Filed: Sep. 8, 1981

[51] Int. Cl.³ ............................................. B65G 13/00
[52] U.S. Cl. .................................... 193/35 C; 193/37
[58] Field of Search ................ 193/35 R, 35 A, 35 C, 193/37; 198/780, 785

[56] References Cited

U.S. PATENT DOCUMENTS

| | | | |
|---|---|---|---|
| 1,038,514 | 9/1912 | Anderson, Jr. | 193/37 |
| 2,729,321 | 1/1956 | Morrison | 193/35 |
| 3,117,662 | 1/1964 | Wahl et al. | 193/37 |
| 3,209,879 | 10/1965 | Wahl | 193/35 C |
| 3,269,502 | 8/1966 | Kornylak | 193/35 |
| 3,655,021 | 4/1972 | Froio | 193/35 A |

*Primary Examiner*—Jeffrey V. Nase
*Attorney, Agent, or Firm*—Fay & Sharpe

[57] ABSTRACT

A guide system or rollerway in a gravity type conveyor which includes a plurality of first and second cylindrical rollers journalled for rotation about axes extending transversely between a pair of elongated rails and disposed at spaced intervals along the rail lengths. The first rollers are load bearing and each includes a resiliently compressible load bearing surface around the outer circumference thereof. The nature of the load bearing surfaces is such that they act as speed control devices for a load. The second rollers are in general alignment with each other along the rail lengths and each includes a generally radial outwardly extending guide flange adapted for engagement by a load conveyed therepassed. The second rollers are smaller in diameter than the first rollers and are normally non-load bearing. When loading of the first rollers reaches some predetermined maximum level, the load bearing surfaces thereof are radially compressed to such an extent that the second rollers become load bearing. The second rollers thus aid in preventing further compression of the load bearing surfaces before any permanent damage is imparted thereto. In the preferred arrangement, the resilient load bearing surfaces and guide flanges are defined by or included on ring-like members closely disposed about the first and second rollers themselves. The new live guide arrangement may be used in conjunction with or as a part of conventional roller type conveyors or it may be used by itself to accommodate load guiding and/or speed control in a wide variety of material handling environments.

21 Claims, 6 Drawing Figures

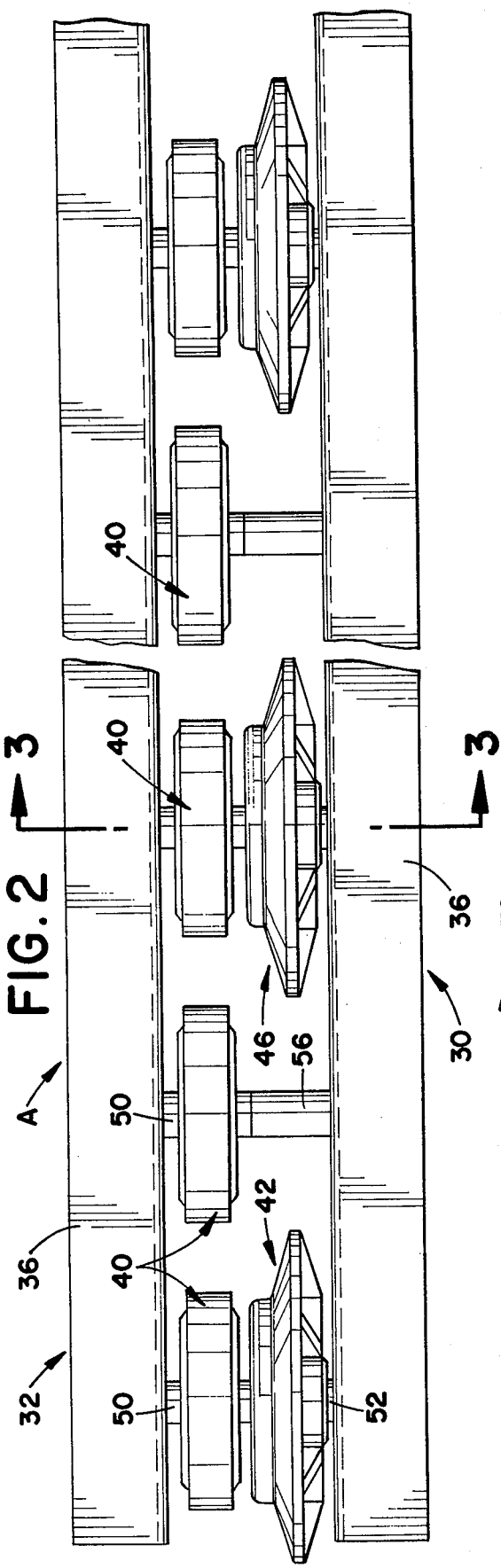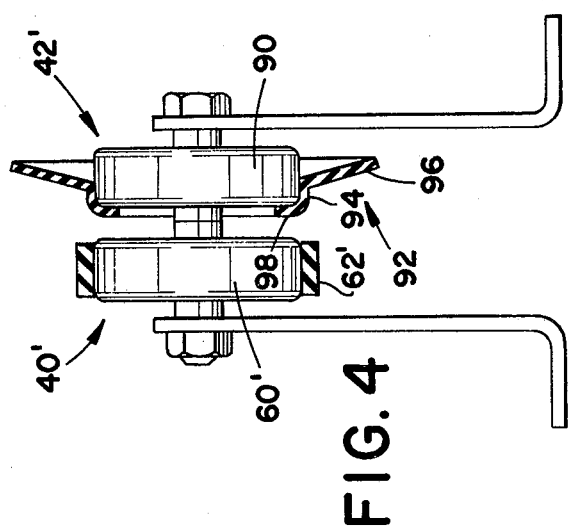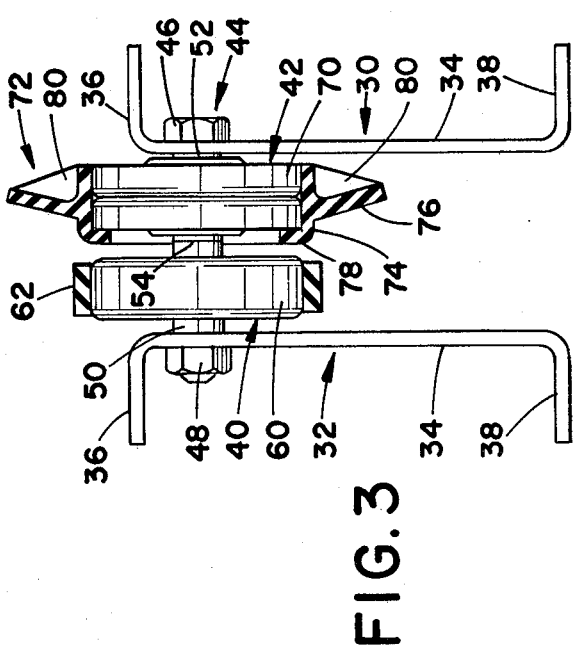

4,448,296

LIVE GUIDE SYSTEM FOR GRAVITY CONVEYORS

BACKGROUND OF THE INVENTION

This invention relates to material handling equipment and more particularly, to conveyor systems.

The invention is particularly applicable to a live guide system or rollerway in gravity type conveyors and will be described with particular reference thereto. However, it will be appreciated by those skilled in the art that the invention has broader applications and may be adapted for use in many different environments.

Gravity conveyors per se are well known in the art. While such conveyors may take many forms, one common type utilizes cylindrical rollers or wheels journalled between a pair of parallel spaced apart frame members at spaced intervals therealong for purposes of defining a conveyor section. Typically, a plurality of metal rollers are commonly journalled between the rails about axes which are normal or perpendicular to the rail lengths. A plurality of the conveyor sections may be disposed in end to end and/or side by side relationships so that the rollers or wheels define a flowpath along which loads, workpieces or the like may be conveyed from one area or work station to another. While the subject invention finds particular use in connection with the foregoing general type of gravity conveyor system, it will be appreciated that there are a number of other types and styles of such systems available. The broad concepts of the subject invention are deemed equally applicable to use in conjunction with or in place of the various alternative systems.

Because of the nature of the rollers employed in the foregoing conveyor systems, and in addition to the normal rolling relationship, loads travelling along a flowpath may experience a sliding relationship relative to the rollers. Such sliding is commonly referred to as walking and comprises movement of the load to one side or the other of the conveyor centerline. This walking is typically caused by a lack of conveyor levelness or improper alignment and may allow the load to travel off of the predetermined desired and/or safe path.

When loads are being moved along gravity type conveyors, it is oftentimes thus considered desirable, even necessary, to provide appropriate load guiding capabilities at the conveyor side edges. Heretofore, such guiding has oftentimes been effected by simply utilizing additional conveyor sections positioned adjacent and normal to the load bearing sections. Such arrangement adds undesired overall costs to the conveyor system since use of these additional conveyor sections overcompensates for the actual amount of guiding assistance typically required. Moreover, use of additional conveyor sections to provide side guiding often involves makeshift arrangements which are easily disturbed during actual use to cause disruptions in the conveying action.

Other types of makeshift guide arrangements have also been previously employed. These have similarly proved to be lacking in desired guide capabilities and flexibility of use. Furthermore, previously known conveyor guide arrangements have been stationary relative to loads conveyed therepassed. Such stationary mountings or relationships create friction between the load and guides thus reducing the effectiveness or efficiency of a gravity conveying action.

Another problem encountered with gravity type conveyors is one of load speed control. Typically, such conveyors do not include any means to effect speed control so that load speed along a flowpath is primarily a function of load size, initial load speed, condition of the conveyor rollers and flowpath conformation. Oftentimes, a combination of the foregoing factors in such that load speed is too high and beyond acceptable or safe limits. Here, too, prior efforts at providing some type of speed control means were primarily makeshift and directed to individual conditions.

It has, therefore, been considered desirable to develop an effective guide and speed control system for gravity type conveyors. The subject invention is believed to meet these needs while overcoming the foregoing problems and others to provide a new and improved live guide system or rollerway for gravity conveyors which is simple, effective, versatile, provides load speed control, is adapted to use in a wide variety of conveying applications and which may be employed in conjunction with conventional gravity conveyors, as part of conventional gravity conveyors or in place of such conveyors.

BRIEF DESCRIPTION OF THE INVENTION

The subject invention provides a new and improved live guide system or rollerway which readily accommodates guiding of loads or workpieces along some predetermined planar flowpath. In addition, load speed control along the flowpath may be advantageously obtained.

In accordance with the present invention, the guide or rollerway includes at least one elongated rail having an uppermost area and a plurality of cylindrical rollers rotatably journalled at spaced intervals along the rail about axes disposed generally normal to the rail length. First ones of these rollers include a resiliently compressible load support surface at the outer circumferences thereof adapted to support a load passing along the flowpath. Second ones of the rollers include load guide flanges extending generally radially outward from the outer circumferences thereof adapted to guide a load passing along a flowpath. The second rollers have diameters less than the diameters of the first rollers by some preselected general increment of radius and are adapted to aid in supporting a load when the resilient load support surfaces of the first rollers have been radially compressed under load by an amount generally equal to the predetermined increment. Compression of the load support surfaces under the weight of a load act as individual speed control devices.

In accordance with another aspect of the invention, at least one first roller and one second roller which are independently rotatable are commonly journalled to the rail in an axially spaced apart relationship with each other at a plurality of sapced intervals along the rail length. Also, at least the second rollers are in general alignment with each other along the rail length. In the preferred arrangement, a pair of laterally spaced apart rails are employed with the rollers being journalled transversely therebetween.

According to a further aspect of the invention, each load support surface associated with a first roller is defined by an annular load supporting ring received over the outer circumference of a first roller hub. Each load guide flange associated with a second roller comprises a part of a guide ring received over the outer circumference of a second roller hub. Preferably, each guide ring also advantageously includes thrust resisting means for retaining the ring on the associated second roller hub against generally axial load forces exerted on the guide flange.

According to yet another aspect of the invention, alternating ones of the roller mountings are comprised of at least one first roller and a second roller commonly journalled between the pair of rails. Interposed along the rails between each of the foregoing mountings is at least one first roller.

The principal object of the present invention is the provision of a new and improved live guide system or rollerway for a gravity type conveyor.

Another object of the invention resides in such a live guide or rollerway which is simple in design and construction.

Still another object of the invention is the provision of a live guide or rollerway which prevents overloading of the load bearing rollers included therein and provides for control of load speed along a flowpath.

A further object of the invention is found in the provision of a new and improved live guide system or rollerway in a gravity type conveyor adapted for a variety of different applications in a broad range of environments.

Still other objects and advantages for the invention will become readily apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 2 is a plan view of a portion of the guide system or rollerway of the subject invention;

FIG. 3 is a cross-sectional view taken along lines 3—3 of FIG. 2;

FIG. 4 is a view similar to FIG. 3 showing an alternative guide roller construction;

DETAILED DESCRIPTION OF THE PREFERRED AND ALTERNATIVE EMBODIMENTS

Figure 1:
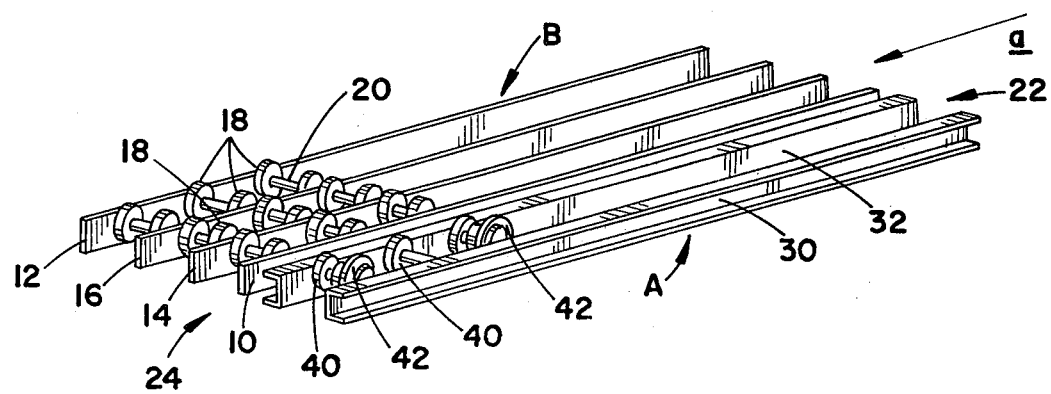
FIG. 1 is a somewhat schematic perspective view showing the subject new guide system or rollerway in combination with a conventional gravity type conveyor.

Referring now to the drawings wherein the showings are only for purposes of illustrating preferred and alternative embodiments of the invention and not for purposes of limiting same, FIG. 1 shows the subject new live guide system or rollerway A disposed in longitudinal cooperation with a section of a conventional gravity type conveyor B. As shown, conveyor B is utilized to transport loads such as workpieces, boxes, crates, pallets and the like in the direction designated by arrow a.

More particularly, gravity conveyor B is of a known type and includes, for example, a pair of spaced apart elongated side rails 10,12 and a pair of elongated intermediate rails 14,16 interposed between and longitudinally coextensive with the side rails. A plurality of rollers 18 are journalled as by axles 20 transversely between rail pairs 10,14, 14,16 and 16,12. These rollers are identical to each other and may comprise a type commonly referred to as "skate wheels". Such wheels or rollers are cylindrical and act to define a planar flowpath along the upper surface of conveyor B between first end 22 and second end 24.

As is known, a plurality of gravity conveyor sections may be placed in an end to end and/or side by side relationship so as to provide a flowpath with length and width dimensions to suit a particular need or application. In addition, it should be readily noted that the gravity conveyor B may take any number of other shapes or forms as is known in the art without in any way departing from the overall intent or scope of the present invention. The gravity conveyor B shown in FIG. 1 is merely illustrative of one type with which the subject new invention may be used and does not, in and of itself, comprise a part of the invention.

Referring now to FIGS. 1, 2 and 3, live guide system A is there shown as being comprised of a pair of parallel spaced apart side rails 30,32. Each side rail has a generally U-shaped configuration including a base 34 and a pair of legs 36,38 extending outwardly therefrom. As will become apparent hereinafter, the specific cross-sectional conformation of the side rails is not itself critical to practicing the invention. Also, and while the transverse spacing between rails 30,32 is of no particular significance, a distance of slightly under 2" is involved in the arrangement shown. Rotatably journalled about axes extending normal to side rails 30,32 are a plurality of first load supporting rollers generally designated 40 and a plurality of guide rollers generally designated 42. As shown in FIG. 2, alternating ones of the roller mountings are comprised of one load supporting roller 40 and one guide roller 42 while the other roller mountings are comprised of a single load supporting roller 40.

All of rollers 40,42 are rotatably journalled between bases 34 of side rails 30,32 by means of elongated axles 44. In the preferred arrangement shown, these axles comprise elongated threaded fasteners with the fastener head 46 retaining the axle in position relative to rail 30 and a nut 48 retaining the axle in position relative to rail 32. Each load supporting roller 40 includes a hollow mounting sleeve or tube 50 having a length at least slightly longer than the width of the associated load supporting roller to facilitate roller positioning and accommodate free roller rotation. Each guide roller 42 similarly includes a mounting sleeve or tube 52 with the commonly journalled first and second rollers having the associated sleeves 50,52 interfaced at area 54. Rollers 40,42 each advantageously includes a ball bearing type of mounting (not shown) relative to the associated one of sleeves 50,52 to facilitate low friction roller rotation. In those roller installations comprised of a single load supporting roller 40, an additional tubular spacer sleeve 56 (FIG. 2) is received on the axle and cooperates with sleeve 50 of the associated load supporting roller for maintaining the roller in the desired position. All of the load supporting and guide rollers are journalled to extend above the top surface of guide system A as defined by legs 36 of side rails 30,32. In this fashion, the side rails will not interfere with a load supported by and travelling along the system.

Each load supporting roller 40 is comprised of a cylindrical hub 60 having a resiliently compressible load supporting surface disposed about the outer periphery or circumference thereof. In the preferred construction shown, hubs 60 comprise conventional rollers or wheels which may include mounting sleeve or tubes 50 as an integral part thereof. Load supporting surfaces 62 are defined by annular rings constructed from rubber or resilient elastomeric material and are received about the circumference of the hub. The particular rubber or elastomeric material employed preferably has physical characteristics which allow it to frictionally engage a load passing thereby in engagement therewith. Such frictional engagement acts as a speed control for the load in a manner to be described. Retention of the rings which define load supporting surfaces 62 on hubs 60 may be effected simply by a close fitting relationship therebetween and may be conveniently supplemented by a suitable adhesive or the like.

Load supporting surfaces 62 have a predetermined thickness so that all of the load supporting rollers will have substantially the same outside diameter. Typically, the thickness of the rings which define surfaces 62 may be on the order of magnitude of 3/16" or so, although other thicknesses may also be advantageously employed without departing from the overall intent and scope of the invention. Also, the compressibility characteristics of load supporting surfaces 62 are known and taken into account in the manner to be hereinafter described.

In the construction shown in FIGS. 2 and 3, guide rollers 42 are also each comprised of a cylindrical hub 70 with a generally annular guide ring 72 disposed thereon. In FIG. 3, it will be seen that hub 70 has a slightly different confirmation than hub 60. Here, also, however, hub 70 comprises a commercially available wheel or hub wherein mounting sleeve or tube 52 may comprise an integral part thereof. As shown, hub 70 has a slightly smaller outside diameter than hub 60, although such relationship is not mandatory. Annular guide ring 72 may be constructed from any number of different materials and in the preferred arrangement shown, a rubber or poylmeric material is employed.

Each guide ring includes a body portion 70 having a guide flange 76 and a thrust resisting means 78. Body portion 70 is configured to be closely received about the outside periphery or circumference of hub 70 and guide flange 76 has a generally frusto-conical conformation tapering away from the adjacent load supporting roller over its radial extent or positively defining a portion of a flow path side edge. In addition, the outside diameter of flange 76 is greater than the outside diameter of the associated load support roller 40 so as to extend above the plane of the flowpath. Also, a plurality of radial spoke-like support ribs 80 are provided for the guide flange to increase its resistance to deformation when contacted by a load. Thrust resisting means 78 comprises an annular end rim or shoulder disposed in engagement with the inner side edge of hub 70. This rim or shoulder resists axial movement or displacement of guide ring 72 relative on hub 70 when guide flange 76 is engaged by a load. Here, too, it will be appreciated that the thrust resisting means may take other forms or shapes within the overall scope of the present invention.

As will be appreciated from FIG. 3, the outside diameter of load supporting roller 40 across supportihg surface 62 is greater than the outside diameter of guide roller 42 across body portion 74. This feature and dimensional relationship is considered highly advantageous for preventing undesired overloading of the load supporting rollers. More particularly, only load supporting rollers 40 are normally adapted to rollingly support a load as it traverses a flowpath. Guide rollers 42 are designed so that under loading, only guide flanges 76 are adapted to engage the load and thereby maintain a desired course therefor along the flowpath. However, and since load supporting surfaces 62 are resiliently compressible, any load received thereon will cause at least a certain amount of such compression. In the event compression approaches some predetermined limit, load supporting surfaces 62 will be compressed to an extent where body portions 74 of guide rings 72 will share in the load support function. This then provides additional load support area to alleviate an undesired overloaded condition of support surfaces 62. To successfully obtain the foregoing results, the compressibility of the particular material employed for support surfaces 62 and the maximum degree of compression desired or allowable therefor must be taken into account in determining the differential radial increment between supporting rollers 40 and guide rollers 42.

Referring again to FIG. 1, a single section of guide system A is shown operatively disposed coextensive with a longitudinal side edge of gravity conveyor B. It will be readily appreciated that a second guide system could be disposed along the outer side edge of the gravity conveyor so that both side edges of the flowpath would be positively defined. In any event, guide system A is mounted closely adjacent and longitudinally coextensive with gravity conveyor B so that the top surface of load supporting rollers 40 will be generally coplanar with or just slightly above the flowpath defined by conveyor rollers 18. If desired, guide system A may be secured directly to the gravity conveyor itself or may be secured to separate support means.

A load passing along gravity conveyor B in direction a will be supported by conveyor rollers 18 and load supporting rollers 40. As noted above, and unless the load is such that surfaces 62 approach a preselected overload condition, guide rollers 42 will not function in a load bearing capacity. Rather, guide flanges 76 on these rollers will merely act to maintain the load on and guide it along the flowpath. Such guidance is effected by engagement of the load with the guide flanges during the course of load travel along the flowpath. Thrust resisting means 78 in each guide ring 72 acts to prevent axial displacement of the guide ring from the associated hub 70 as a result of load contact with guide flange 72. Because load support surfaces 62 are constructed from rubber or similar elastomeric material, they will be slightly radially compressed and axially expanded by a load to thus act as individual speed control devices for the load. That is, and because of the physical characteristics, work or energy from the load is required or expended in flexure of surfaces 62 to automatically result in a type of load speed control longitudinally of the flowpath. In addition, surfaces 62 will aid in preventing side-to-side movement or walking of the load.

The foregoing arrangement is considered advantageous in that it provides a live guide system or rollerway having a generally frictionless relationship with loads coming into contact therewith. Moreover, the new system provides a relatively simple construction with a speed control feature which overcomes problems encountered with previously known and utilized arrangements for gravity type conveyors. Still further, guide system or rollerway A is flexible in application and may be adapted to a wide variety of environments. For example, the system may be curved or arcuate in shape to facilitate use with a conveyor which itself defines a curved or arcuate flowpath. Other examples of versatility for the invention will be described hereinafter.

FIG. 4 shows a slight modification for the guide rollers which may be advantageously employed in practicing the concept of the subject invention. For ease of illustration and appreciation of this modification, like components are identified by like numerals with a primed (') suffix and new components are identified by new numerals.

More particularly, hub 90 for guide rollers 42' is identical to hub 60' used in load supporting rollers 40'. In addition, guide ring 92 comprises a sheet metal stamping or the like wherein body portion 94, guide flange 96 and thrust resisting means 98 are integrally formed therein. Even though hubs 60',90 are identical, the thickness of the sheet metal employed for guide ring 92 is less than the thickness of the ring which defines load supporting surface 62'. This then allows the outside diameter of guide roller 42' across body portion 94 to be maintained smaller than the outside diameter of load supporting roller 40'. Such relationship facilitates the same protection against overloading of the load supporting rollers as described above. In addition, FIG. 4 demonstrates a slight modification to side rails 30',32'. In particular, these side rails have generally L-shaped cross-sections comprised of a base 34' and a lower leg 38' extending outwardly therefrom. Still other side rail conformations may be satisfactorily employed within the scope of the invention.

Referring again to FIG. 1, it is also possible to employ the concept of the roller conveyor B. In that case, for example, selected ones of rollers 18 which are disposed along one or both of the conveyor side edges could be replaced by guide rollers 42. A live guide arrangement would thus be incorporated directly into the roller conveyor. The outside diameter of the body portions for those guide rollers 42 used in this alternative construction would preferably be less than the outside diameter of those rollers 18 which remain in the construction of conveyor B. It would also be possible to replace additional ones of rollers 18 with load supporting rollers 40 and thereby obtain the entirety of the advantageous operating results previously described hereinabove.

Figure 5:
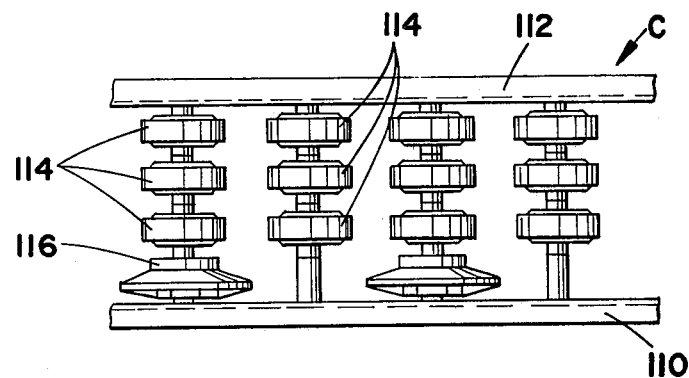
FIG. 5 shows one alternative arrangement for the new guide or rollerway system; and, FIG. 6 shows another alternative arrangement for the new guide system or rollerway.
Figure 6:
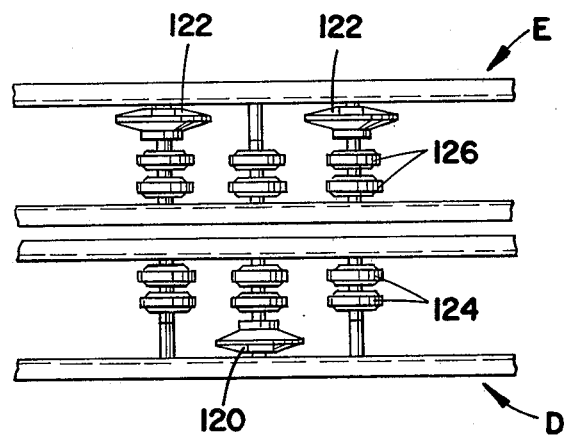

Still other examples of the subject new guide system or rollerway which further demonstrate its versatility are shown in FIGS. 5 and 6. Both of these alternative embodiments include modifications which enhance the system or rollerway construction for use in different applications and/or environments.

In FIG. 5, guide system or rollerway C includes a pair of spaced apart side rails 110,112 in the same manner previously described. Here, however, a plurality of first or load supporting rollers 114 are commonly journalled with each second guide roller 116 at alternating ones of the roller mountings. The other of the roller mountings comprise a plurality of commonly journalled load supporting rollers 114. The construction of rollers 114,116 and the mounting therefor between side rails 110,112 are substantially similar to that previously described. The principal benefit obtained from the aeternative guide system or rollerway shown in FIG. 5 resides in the provision of a greater load support area. Thus, load supporting rollers 114 provide a greater width of load bearing capacity and, in some cases, may be used in place of the conventional gravity conveyor sections. Of course, even a greater number of load supporting rollers could be employed if so desired.

FIG. 6 shows a pair of guide systems or rollerways D, E disposed in a side by side relationship. Guide rollers 120 of system or rollerway D define one side edge of a flowpath and guide rollers 122 of system or rollerway E are reversed from rollers 20 so as to define the other side edge of the flowpath. Load supporting rollers 124,126 of both systems D, E are disposed so as to define the planar flowpath itself. In this manner, the necessity for using conventional gravity conveyor sections in conjunction with the new guide system or rollerway is eliminated. As shown, guide rollers 120,122 are disposed in a staggered relationship relative to each other. Such arrangement is particularly desirable when loads to be moved along the flowpath are only slightly narrower than the width of the flowpath itself as defined between guide rollers 120,122 for reducing the potential for load binding between the guide rollers. Of course, guide rollers 120,122 could also be positioned in an opposed, straight line relationship if desired.

In addition to the alternative shown in FIG. 6, it would also be possible to, in effect, combine systems D, E into a single unit by eliminating the centrally disposed or inner side rails and by commonly mounting guide rollers 120,122 and load supporting rollers 124,126 between the pair of outer side rails. In this manner, a single system would define the flowpath and would also include guide rollers for maintaining load guidance along the flowpath.

The invention has been described with reference to the preferred and alternative embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A live guide and load speed control mechanism for a gravity type conveyor wherein a load is supported by and passed along a planar flowpath defined by said conveyor, said mechanism comprising:
   a rail disposed longitudinally of said flowpath adjacent one side edge thereof and having an uppermost portion disposed beneath the plane of said flowpath; a plurality of cylindrical rollers each including an outer circumferential surface and being journalled to said rail at spaced intervals therealong for rotation about axes generally normal to the rail length, wherein at least some of said plurality of rollers are mounted such that at least a pair of commonly journalled rollers are disposed in an axially spaced apart relationship with each other; a first roller in each said pair including an annular load support ring of compressible material received on the roller outer circumferential surface and adapted to support a load; and, a second roller in each pair having a generally annular guide ring received on the roller outer circumferential surface, said guide ring including a body portion having a generally radially outward disposed load guiding flange extending circumferentially thereof adapted to guide a load moving along said flowpath and a thrust resisting means for retaining said guide ring on the associated second roller.

2. The mechanism as defined in claim 1 wherein said first rollers in said pairs are in general alignment with each other along the length of said rail and said second rollers in said pairs are in general alignment with each other along the length of said rail.

3. The mechanism as defined in claim 1 wherein the outside diameter of said first rollers across said support rings is greater than the outside diameter of said second roller across said guide ring body portions with said body portions being disposed by some predetermined increment beneath a load support plane normally defined by said first rollers, each of said body portions adapted to support a load in response to the load support ring of the commonly journalled first roller being radially compressed by an amount equal to said predetermined increment.

4. The mechanism as defined in claim 3 wherein said plurality of rollers are comprised of generally identical roller hubs having said support and guide rings closely received thereon.

5. The mechanism as defined in claim 1 wherein the load guiding flange on each of said second rollers is generally frusto-conical and diverges outwardly from the associated second roller in a direction away from said flowpath one side edge.

6. The mechanism as defined in claim 5 wherein said guide rings are constructed from a resilient material and each includes a plurality of ribs disposed at arcuate intervals around said body portion and extending radially outward therefrom in a supporting relationship with said load guiding flange.

7. The mechanism as defined in claim 5 wherein said guide rings comprise sheet metal stampings.

8. The mechanism as defined in claim 1 wherein said thrust resisting means comprises a shoulder engaging the end edge of the outer circumferential surface on the associated second roller which faces the associated first roller.

9. The mechanism as defined in claim 1 wherein alternating ones of said plurality of rollers are mounted along the length of said rail as said pairs of rollers, the other of said plurality of rollers comprising additional first rollers which are mounted in general alignment along said rail length with the first rollers of said pairs.

10. The mechanism as defined in claim 9 further including a pair of coextensive rails laterally spaced apart from each other and having said plurality of first and second rollers journalled therebetween.

11. A gravity conveyor rollerway adapted to provide a live side guide and load speed control along a load flowpath and comprising:
an elongated rail having an uppermost area; a plurality of cylindrical rollers rotatably journalled at spaced intervals along said rail about axes generally normal to the rail length and located to extend above said uppermost area; first ones of said rollers each including a resiliently compressible load supporting surface around an outer circumference thereof adapted to support a load passing along a flowpath; second ones of said rollers including load guide flanges extending generally radially outward therefrom adapted to guide a load passing along a flowpath; and, said second rollers normally having diameters less than the diameters of said first rollers by some preselected increment and being adapted to support a load passing along a flowpath as the load supporting surfaces of said first rollers have been compressed by said predetermined increment when supporting a load.

12. The rollerway as defined in claim 11 wherein at least one first roller and at least one second roller are commonly journalled to said rail in an axially spaced apart relationship with each other at spaced intervals along the rail length, at least said second rollers being in general alignment with each other over the rail length.

13. The rollerway as defined in claim 11 further including a pair of laterally spaced apart rails, said rollers being journalled transversely between said rails at spaced intervals therealong.

14. The rollerway as defined in claim 11 wherein said load support surfaces are defined by resiliently compressible rings disposed about the outer circumference of said first rollers.

15. The rollerway as defined in claim 14 wherein said guide flanges are included on generally annular guide rings disposed about the outer circumference of said second rollers.

16. The rollerway as defined in claim 15 wherein said guide rings further include thrust resisting means cooperating with the associated second rollers and adapted to retain said guide rings on said second rollers against forces imparted to said guide flanges by a load passing along a workpath.

17. A live guide mechanism for a gravity type conveyor of the type having a plurality of cylindrical rollers of a first diameter journalled between a pair of elongated outer side rails at spaced intervals therealong for rotation about axes generally normal to the rail lengths and defining a planar flowpath for a load, and wherein some of said rollers disposed adjacent one of said side rails define one side edge for said flowpath, said guide mechanism comprising:
at least selected ones of said some rollers comprising generally cylindrical guide rollers having generally annular guide rings received on the outer circumferential surfaces thereof, said guide rings each including a body portion having a generally radially outward disposed load guiding flange extending circumferentially thereof and thrust resisting means for retaining said guide ring on the associated one of said guide rollers, said body portions having diameters less than said first diameters so as to normally be positioned beneath the plane of said flowpath with said guiding flanges having diameters greater than said first diameter so as to extend above the plane of said flowpath, said guiding flanges adapted to guide a load moving along said flowpath and said thrust resisting means adapted to resist the forces applied to said guiding flanges by a load.

18. The guide mechanism as defined in claim 17 wherein said guide rollers are in general alignment with each other along the length of said one side rail.

19. The guide mechanism as defined in claim 18 wherein the load guiding flange on each guide roller is generally frusto-conical and diverges outwardly from the associated guide rollers in a direction away from said flowpath one side edge.

20. The guide mechanism as defined in claim 19 wherein said thrust resisting means comprises a shoulder engaging the end edge of the outer circumferential surface on the associated guide roller.

21. The guide mechanism as defined in claim 20 wherein some of said rollers disposed adjacent each of said side rails define laterally spaced apart flowpath side edges and wherein at least selected ones of said some rollers adjacent each side rail comprise said guide rollers, the guide rollers adjacent one of said rails being in opposed relationship to the guide rollers adjacent the other of said side rails.

* * * * *